(12) United States Patent
Choi

(10) Patent No.: US 6,481,341 B1
(45) Date of Patent: Nov. 19, 2002

(54) ANTI-BURN TOASTER

(75) Inventor: Hon Chung Choi, Kowloon (HK)

(73) Assignee: Hon Way Plastic & Metal Manufacturing Co. Ltd., Kowloon (HK)

( * ) Notice: Subject to any disclaimer, the term of this patent is extended or adjusted under 35 U.S.C. 154(b) by 0 days.

(21) Appl. No.: 10/085,252

(22) Filed: Feb. 27, 2002

(51) Int. Cl.[7] .............................. A47J 37/08; H05B 1/02
(52) U.S. Cl. .................... 99/327; 99/329 P; 99/329 RT; 99/332; 99/385; 99/389; 99/391; 219/392; 219/413; 219/514; 219/521
(58) Field of Search .......................... 99/326–333, 337, 99/338, 385–393; 219/392, 412–414, 514, 518, 521, 385, 386, 494, 497; 200/1 R, 283, 245–247; 392/373–375, 337, 407; 426/241, 243, 466, 523

(56) References Cited

U.S. PATENT DOCUMENTS

| | | | | |
|---|---|---|---|---|
| 3,869,970 A | * | 3/1975 | Eagle | 99/329 R |
| 3,956,978 A | * | 5/1976 | Borley | 99/329 R |
| 4,986,173 A | * | 1/1991 | Hahnewald et al. | 99/331 X |
| 5,018,437 A | * | 5/1991 | San Juan | 99/327 |
| 5,044,263 A | * | 9/1991 | Birkert et al. | 99/327 |
| 5,085,136 A | * | 2/1992 | Eisenberg | 99/391 |
| 5,097,751 A | * | 3/1992 | Eisenberg et al. | 99/327 |
| 5,304,782 A | * | 4/1994 | McNair et al. | 219/518 |
| 5,647,270 A | * | 7/1997 | Rousseau et al. | 99/327 |
| 5,918,532 A | * | 7/1999 | Arnedo et al. | 99/327 |
| 5,947,006 A | * | 9/1999 | Mauffrey | 99/389 X |
| 6,123,012 A | * | 9/2000 | Hardin et al. | 99/326 |
| 6,230,611 B1 | * | 5/2001 | Mauffrey | 99/327 |

* cited by examiner

Primary Examiner—Timothy F. Simone
(74) Attorney, Agent, or Firm—David P. Gordon; David S. Jacobson; Thomas A. Gallagher

(57) ABSTRACT

A toaster mechanism includes a base, a carriage movable relative to the base and including a hook and a switch bar, a first switch associated with heating elements of the toaster and supported by the base and being activated by the switch bar, a timer-deactivated electromagnet supported by the base, a catch block movably supported by the base and including a bearing surface against which the hook can bear to move the block, a catch surface to catch the hook, a ferrous part interacting with the electromagnet, and an activating surface. A second switch is associated with the electromagnet and is in series electrically with the first switch. The first switch receives electric current only when the second switch is closed by the activating surface of the catch block. This ensures that toast does not burn if it is jammed in the toaster after a specified toasting time.

13 Claims, 4 Drawing Sheets

ANTI-BURN TOASTER

BACKGROUND OF THE INVENTION

1. Field of the Invention

The present invention relates to toasters. More particularly, though not exclusively, the invention relates to a toaster having a switching mechanism that prevents burning of toast, should the toast become jammed therein.

2. State of the Art

Known toasters have heating elements situated at either side of a bread-receiving bay. These elements received an electric current upon depression of a lever, which allows the bread to descend into the bay. When the lever is depressed, a mechanical switch is activated to provide current to the elements. When a timer signals the end of a toasting period, a catch is triggered and the toast is usually ejected. However, should the toast become warped or be too thick for the bay, it may become jammed. Current is still delivered to the elements because the mechanical switch remains closed.

SUMMARY OF THE INVENTION

It is an object of the present invention to overcome or substantially ameliorate the above disadvantage and/or more generally to provide an improved toaster mechanism.

There is disclosed herein a toaster mechanism comprising:

a base, a carriage adapted to move relative to the base, the carriage including a hook and a switch bar, a first switch associated with heating elements of the toaster and supported by the base and being activated by the switch bar, a timer-deactivated electromagnet supported by the base, a catch block movably supported by the base and including a bearing surface against which the hook can bear to move the block, a catch surface to catch the hook, a ferrous part interacting with the electromagnet, and an activating surface, a second switch associated with the electromagnet and supported by the base and in series electrically with the first switch, the second switch being activated by the activating surface of the block, wherein the first switch receives electric current only when the second switch is closed by the activating surface of the catch block.

Preferably the carriage moves along a track that extends from the base.

Preferably the first and second switches are amounted to a circuit board that extends from the base.

Preferably the catch block is pivotally mounted to the base.

Preferably of the carriages spring-biased away from the base.

Preferably the hook is mounted pivotally to the carriage.

Preferably the hook is spring-biased away from the carriage.

Preferably the catch block is supported pivotally by the base.

Preferably the catch block his spring-biased away from the electromagnet.

Preferably the bearing surface comprises a pair of ramps extending in different directions.

Preferably the directions are substantially normal with respect to one another.

Preferably the first and second switches, the switch bar and hook are so configured that downward movement of the carriage along the track results in the switch bar closing the first switch prior to closure of the second switch upon interaction of the hook, switch block and electromagnet.

Preferably the first and second switches, the switch bar, electromagnet and hook are so configured that upon deactivation of the electromagnet, the switch block releases the hook and opens the second switch prior to opening of the first switch by the switch bar upon upward movement of the carriage.

A preferred form of the present invention will now be described by way of example with reference to the accompanying drawings.

DETAILED DESCRIPTION OF THE PREFERRED EMBODIMENT

Figure 1:
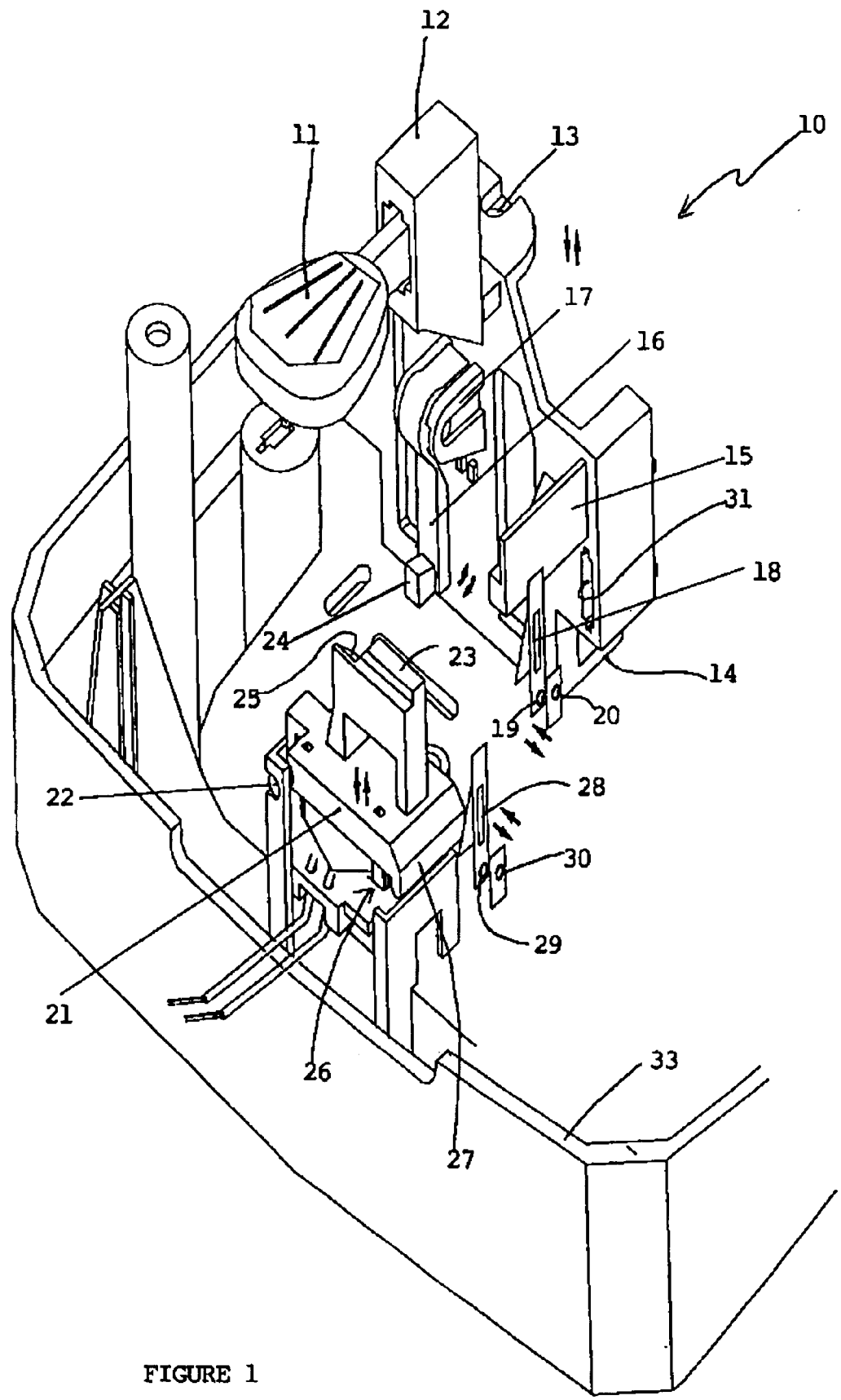
FIG. 1 is a schematic perspective view of a toaster mechanism.
Figure 2:
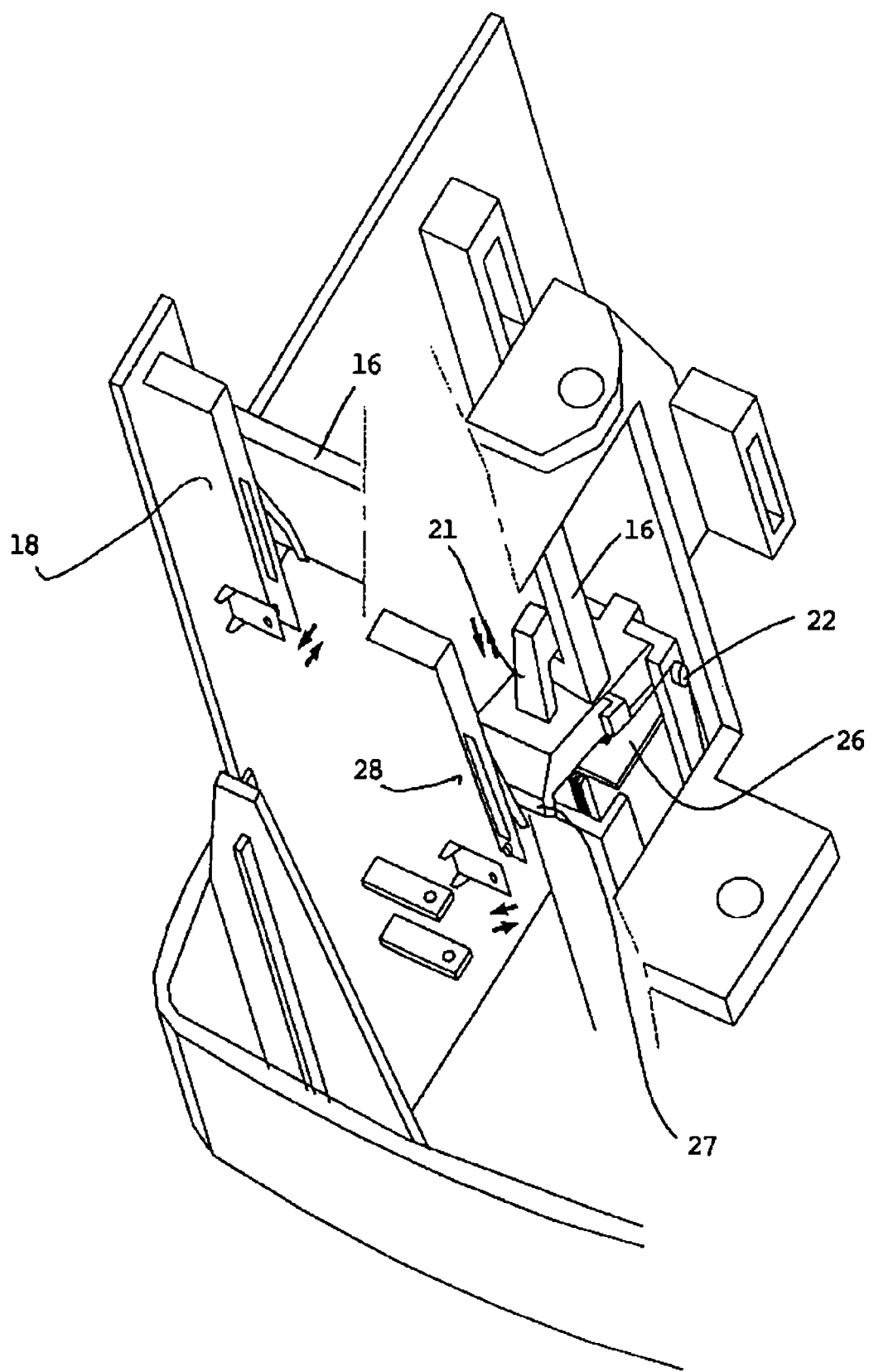
FIG. 2 is a schematic perspective view of the mechanism of FIG. 1 from behind.

In the accompanying drawings there is dramatically depicted a toaster mechanism 10. As shown in FIG. 1, mechanism 10 includes a carriage 12 from which an operational handle 11 extends. Handle 11 extends through a slot formed in the outer shell of the toaster (not shown).

Carriage 12, typically formed of heat resistant plastics material includes track guide holes 13 through which a vertical track 43 (FIG. 6) passes. Another hole would be situated in the bottom part of the carriage to maintain proper alignment of the carriage.

The carriage 12 includes a spring connector 14 to which a spring 48 (FIG. 6) is attached so as to bias the carriage upwardly into a bread receiving/toast delivering position. In this regard, it should be appreciated that a pair of toast-support members (not shown) extend backwards from the carriage 12 into the respective bread receiving bays of the toaster. These members would be attached to the slots 31.

Attached pivotally to the carriage 12 is a hook 16 having a small boss 24 extending forwardly therefrom. The hook 16 is attached pivotally to a spring pivot 17 that extends from the carriage 12. A spring (not shown) is located inside the pivot 17 behind the hook 16 so as to bias the boss 24 forwardly and away from the carriage 12.

A switch bar 15 extends forwardly of the carriage 12.

A vertically oriented circuit board 46 (identified in FIG. 4, but omitted in other figures for clarity) supports a first switch 18 and a second switch 28. These are better shown in FIGS. 3 and 4. First switch 18 includes a fixed contact 20 and a movable contact 19. Movable contact 19 is activated by the switch bar 15 so as to be pressed against the fixed contact 20. The second switch 28 includes a fixed contact 30 and an immovable contact 29. Movable contact 29 is activated by an activating surface 27 of a catch block 21.

The catch block 21 is mounted to the base 33 so as to pivot upon pivot pin 22. The catch block 21 includes a ferrous piece 44 in its underside. Situated beneath the catch block 21 is an electromagnet 26 to attract the ferrous piece 44 and thereby maintain the catch block 21 in a downwardly pivoted position when the electromagnet 26 is activated by the second switch 28.

Figure 3:
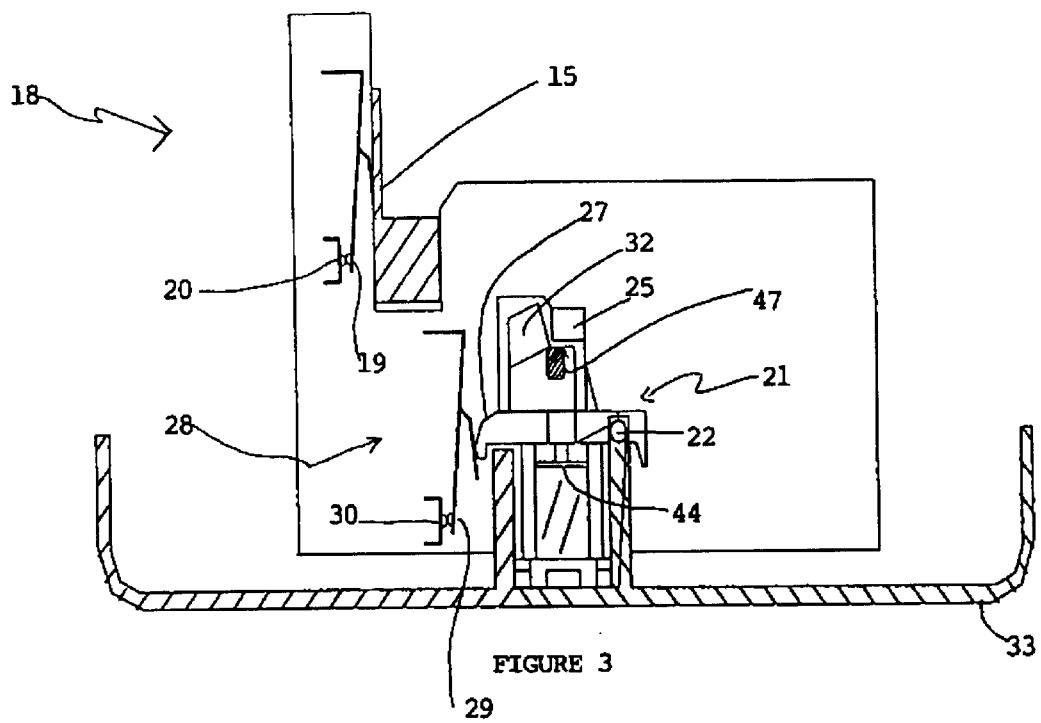
FIG. 3 is a schematic cross-sectional side elevational view of a switching arrangement in a switch-closed configuration.

Referring back to FIG. 1, the catch block 21 includes a first ramp 23 and a second ramp 25. These ramps extend in directions that are mutually substantially normal to one another. Beneath the second ramp surface 25 there is provided a catch surface 47 (FIG. 3). Upon downward movement of the carriage 12, the boss 24 of hook 16 bears against the first ramp surface 23 to cause the catch block 21 to pivot downwardly. At this point, the activating surface 27 closes the second switch 18 to thereby provide an electric current to the electromagnet 26. The carriage continues to be pressed down (almost instantaneously with, or just after interaction of the boss 24 with the first ramp surface 23). The boss then bears against the second ramp surface 25 so as to pivot the hook 16 backwards toward the carriage whereupon it clicks under the catch surface 47 to be retained thereby so long as the electromagnet 26 remains activated.

Prior to the above described interaction of the activating surface 27 with the second switch 28 upon downward movement of the carriage 12, the switch bar 15 has closed the first switch 18. Switches 18 and 28 are connected in series so that current is not provided to the switch 18 unless switch 28 is closed by the activating surface 27.

Figure 4:
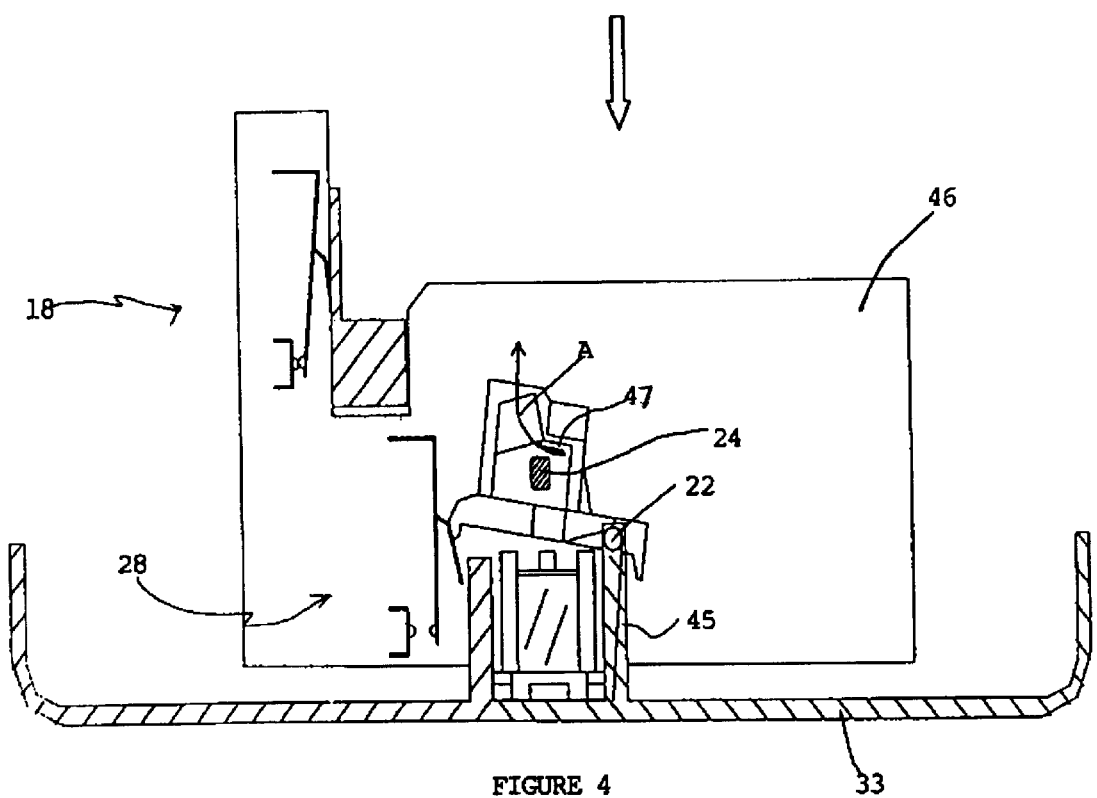
FIG. 4 is a schematic cross-sectional side elevational view of the switching arrangement of FIG. 3 in a first switch closed/second switch open configuration.

Referring to FIGS. 3 and 4, closure of switch 28 initiates a timing circuit on the circuit board 46 to maintain current supplied to the electromagnet for the desired toasting time. Once this time is reached, the electromagnet is deactivated whereupon a spring 45 underneath the catch block 21 causes the catch block to move upwardly into the position depicted. At this time, the boss 24 moves in the direction indicated by arrow A. During this interactive movement of boss 24 with the catch block 21, the boss rides against an internal ramp 32, causing the hook 16 to move backward toward the carriage and therefore release the boss from the catch block. The spring 48 then pulls the carriage upward so as to bring the toast to a user-accessible extraction position.

Figures 5, 6:
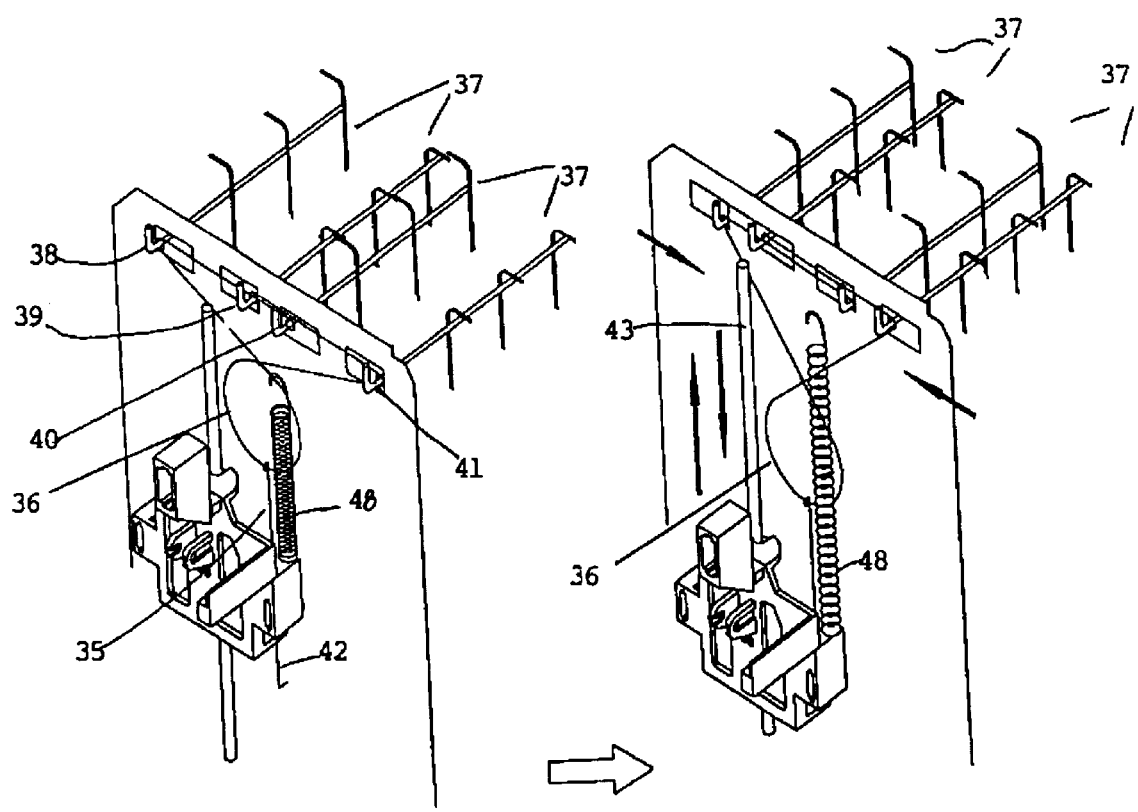
FIG. 5 is a schematic perspective view of other parts of the toaster in a toast-release configuration.
FIG. 6 is a schematic perspective view of the parts of the toaster of FIG. 5 in a toast-cooking configuration.

As shown in FIGS. 5 and 6, the toaster includes toast cradles 37 that move between a toast-receiving/toast-release position as shown in FIG. 5 and a toasting position depicted in FIG. 6. To this end, a wire loop 36 is provided with a wire tie 35 that has a foot 42 at its lower extremity. The bottom part of tie 35 that is just above foot 42 passes through a small aperture in carriage 12. Wire loop 36 passes around pins that extend from ends of the toast cradles. More particularly, one end of loop 36 is wrapped around pin 38 and then extends to pin 40. The other end of the wire 36 is wrapped around pin 41 and then extends to pin 39. Upon downward movement of the carriage 12, the foot 42 is pulled downwardly such that the tie pulls the loop 36 downward. This causes the toast cradles 37 to move from the position depicted in FIG. 5 to the position depicted in FIG. 6. Upon release of the cradle and its upward movement, the cradles return to the position depicted in FIG. 5.

In operation of the described toaster mechanism, burning of toast as a result of jamming of the toast in cradles is not possible upon the activation of the electromagnet, because the activation of the electromagnet opens the second switch to thereby stop the flow of current to the first switch.

It should be appreciated that modifications and alterations obvious to those skilled in the art are not to be considered as beyond the scope of the present invention. For example, the electromagnet might be provided in the catch block, rather than in the base and the switches might be provided on plastic posts instead of being provided on a circuit board to which the time a circuit is integrated.

What is claimed is:

1. A toaster mechanism comprising:
   a base,
   a carriage adapted to move relative to the base, the carriage including a hook and a switch bar,
   a first switch associated with heating elements of the toaster and supported by the base and being activated by the switch bar,
   a timer-deactivated electromagnet supported by the base,
   a catch block movably supported by the base and including a bearing surface against which the hook can bear to move the block, a catch surface to catch the hook, a ferrous part interacting with the electromagnet, and an activating surface,
   a second switch associated with the electromagnet and supported by the base and in series electrically with the first switch, the second switch being activated by the activating surface of the block,
   wherein the first switch receives electric current only when the second switch is closed by the activating surface of the catch block.

2. The toaster mechanism of claim 1 wherein the carriage moves along a track that extends from the base.

3. The toaster mechanism of claim 1 wherein the first and second switches are amounted to a circuit board that extends from the base.

4. The toaster mechanism of claim 1 wherein the catch block is pivotally mounted to the base.

5. The toaster mechanism of claim 1 wherein the carriage is spring-biased away from the base.

6. The toaster mechanism of claim 1 wherein the hook is mounted pivotally to the carriage.

7. The toaster mechanism of claim 1 wherein the hook is spring-biased away from the carriage.

8. The toaster mechanism of claim 1 wherein the catch block is supported pivotally by the base.

9. The toaster mechanism of claim 1 wherein the catch block is spring-biased away from the electromagnet.

10. The toaster mechanism of claim 1 wherein the bearing surface comprises a pair of ramps extending in different directions.

11. The toaster mechanism of claim 10 wherein the directions are substantially normal with respect to one another.

12. The toaster mechanism of claim 1 wherein the first and second switches, the switch bar and hook are so configured that downward movement of the carriage along the track results in the switch bar closing the first switch prior to closure of the second switch upon interaction of the hook, switch block and electromagnet.

13. The toaster mechanism of claim 1 wherein the first and second switches, the switch bar, electromagnet and hook are so configured that upon deactivation of the electromagnet, the switch block releases the hook and opens the second switch prior to opening of the first switch by the switch bar upon upward movement of the carriage.

* * * * *